3,327,261
DIRECTION SENSITIVE DISPLACEMENT
TRANSDUCER
Philip B. Beltz, Wilmington, Del., and Donald W. Brusch, Chadds Ford, Pa., assignors to Hewlett-Packard Company, a corporation of California
Filed Sept. 22, 1965, Ser. No. 489,116
7 Claims. (Cl. 335—152)

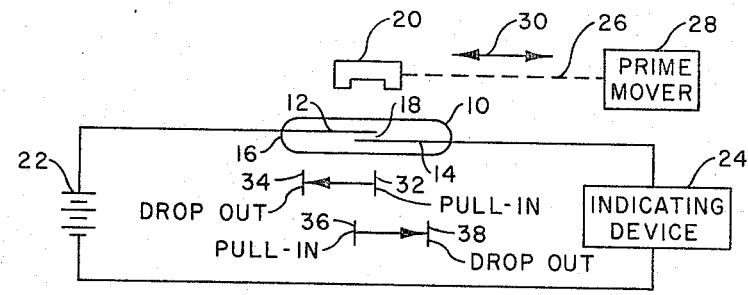
FIG. 1
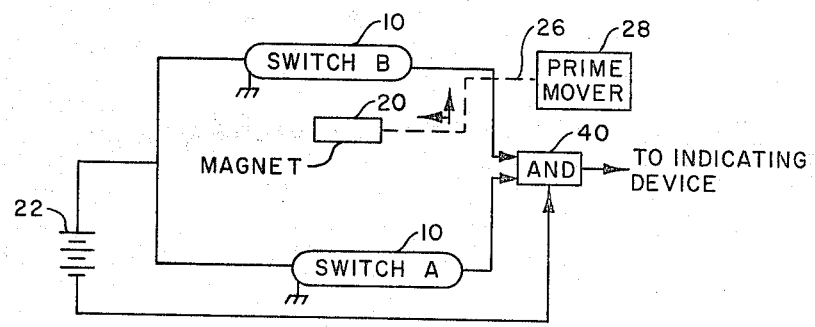
FIG. 2
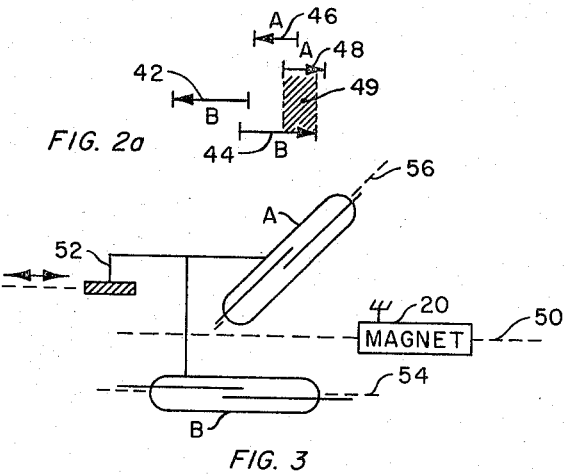
FIG. 2a
FIG. 3
INVENTOR.
PHILIP B. BELTZ
DONALD W. BRUSCH
BY _United States Patent Office_ 3,327,261
Patented June 20, 1967

This invention relates to a displacement transducer and, more particularly, to an easily actuated displacement sensor that is direction sensitive.

It is often desirable to sense the displacement of an object, e.g. the float of a liquid-level indicator, the beam of a weight-measuring device, the pointer of a temperature-limit device, and the like and to generate a signal when such displacement has achieved a predetermined magnitude. Many of the prior art displacement sensors have utilized a microswitch for this purpose. While microswitches have been quite satisfactory, they do require a mechanical force for the actuation that in some cases interferes with the motion of the object itself. For example, in detecting a limiting position for the slide wire of a recorder, the force required to actuate the microswitch often unduly loads the slide wire servosystem and thereby reduces the accuracy of the system.

Reed switches offer some hope of reducing servosystem loading, but unfortunately are not direction sensitive.

It is an object of this invention to sense predetermined unidirectional displacements without unduly loading the object undergoing displacement.

Another object of this invention is to provide an improved directional displacement sensor using reed switches.

A reed switch consists of a tiny glass encapsulated envelope or tube which encloses the switch contacts, in a coil or permanent magnet actuator. The reed type contacts are cantilevered into the inert gas atmosphere of the tube and separated by an air gap. When a magnetic field is brought into the proximity of the contacts and this field or flux reaches the ampere turn value required, the contacts attract one another and close.

In accordance with one embodiment of this invention a permanent magnet is mechanically linked to a prime mover whose displacement along a given axis in a predetermined direction is to be sensed. A pair of reed switches are positioned at different, spaced points along the axis of motion and in such a manner that the maximum flux from the magnet that links the reeds of one of the switches is greater than the maximum flux which links the reeds of the second switch. With proper selection of the relative switch locations along the axis of motion, the reed switches are simultaneously closed when and only when the magnet has attained the predetermined displacement.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

FIGURE 1 is a partial schematic and partial block diagram illustrating a typical displacement sensor of the prior art using a reed switch;

FIGURE 2 is a block diagram of a directionally sensitive reed switching arrangement constructed in accordance with one embodiment of this invention;

FIGURE 2a is a graphic illustration denoting the operating ranges of the reed switches; and FIGURE 3 is a partial schematic representation of a directionally sensitive reed switching arrangement constructed in accordance with another embodiment of this invention.

In FIG. 1 there is illustrated a reed switch 10 which consists of two overlapping, flat, cantilevered reeds 12 and 14 of ferromagnetic material surrounded by a dry inert gas and sealed in a glass envelope 16. A small air gap 18 separates the free overlapping ends of the reeds 12 and 14. When the magnetic field of a permanent magnet 20 (typically composed of aluminum, nickel and cobalt metals) or an operating coil links the reeds 12, 14, the magnetic flux in the gap 18 causes the reeds 12 and 14 to attract each other. The reeds are plated with a precious metal which acts as contacts to complete an electrical circuit between a source of potential illustrated as a battery 22 and a suitable indicating device 24 which may, for example, be a relay actuated alarm. Other suitable electronic circuitry may be utilized instead of the alarm for control purposes.

The magnet 20 is attached by a suitable mechanical linkage, illustrated by the dotted line 26, to a prime mover 28. The prime mover 28 may, for example, be a float, the beam of a balance, the end of a bourdon tube, the slider of a potentiometric recorder, or any other body or object whose displacement is to be sensed. The motion produced by the prime mover 28 is along an axis denoted by the linkage 26 in either of the opposite directions indicated by the double arrow 30. If the motion produced by the prime mover 28 is to the left in the drawing, the contacts 18 close when the pull-in point 32 of the switch is reached and remain closed until the drop-out point 34 is reached. In like manner if the motion of the magnet 20 produced by the prime mover 28 is to the right in the drawing, the contacts 18 are closed at a different pull-in point 36 and remain closed until still another drop-out point 38 is reached.

These respective pull-in and drop-out points 32, 34, 36, and 38 define what is often referred to in a reed switch as the area of actuation of the reeds and is a function of the construction of the particular switch and the flux actually linking or passing through the reeds 12 and 14. In practice either the switch 10 or the magnet 20 may be moved, or both may be moved, relative to the other.

In accordance with the invention a pair of reed switches 10, denoted switch A and switch B (FIG. 2), are fixedly positioned by any suitable means such as a bracket or spring clip to a chassis along the axis of motion of magnet 20. The magnet 20 is positioned or displaced along the axis of motion 26 by the prime mover 28. Switches A and B are positioned such that their axes are substantially parallel to the axis of motion 26, but with switch A being at a greater radial distance from the axis of motion 26 of the magnet 20 than switch B such that it receives lesser linking flux for a given position of the magnet. Additionally, switch A is positioned at a different point along the axis of motion 26 with respect to switch B. Electrically the reeds of the switches A and B are connected to complete parallel circuits from the battery 22 to the inputs of an AND gate 40. The AND gate 40 may be any suitable coincidence gate that provides an output only when both of its inputs are energized. It may, for example, be a relay having two coils, both of which must be energized to close the relay contacts.

In operation, since switch B is radially closer to the axis of motion 26 of magnet 20, its reeds receive more flux and hence are actuated over a greater range of axial motion of the magnet 20 than switch A. In the drawing these regions of actuation are illustrated as the range 42 when the motion of the magnet 20 is to the left in the drawing and over a comparable range 44 when the magnet motion is to the right in the drawing. Conversely the switch A, being radially more remote from the axis of motion 26 of the magnet 20, has a much smaller operating differential. Additionally, since its axial position is closer to the prime mover than switch B, its region of actuation when the magnet's movement is to the left in the drawing, is denoted by the range 46, and the range 48 when the movement of the magnet 20 is to the right in the drawing. It may be seen that both switches A and B are actuated when and only when the motion of the magnet is to the right and over the operating range denoted by the shaded area 49. When the motion of the magnet is to the left in the drawing both of the switches are actuated at different points and the AND gate 40 provides no output signal. The transducer thus is direction sensitive and because of the use of reed switches, requires relatively little force to actuate.

In FIG. 3 there is illustrated another embodiment of this invention wherein the magnet 20 is held in a fixed position relative to the axis of motion 50 of a prime mover whose displacement is to be sensed. In this instance the reed switches A and B are fixedly positioned with respect to each other and connected by a suitable mechanical linkage 52 to be displaced by the prime mover (not shown) along an axis parallel to the axis 50. Switch B is positioned such that its axis 54 is substantially parallel to the axis 50. The axis 56 of switch A is positioned at an angle other than zero with respect to the axis 50. Such angular placement produces a smaller differential operating range for switch A than that of switch B, as was described in conjunction with the embodiment of FIG. 2. Note here again that switch A is displaced along the axis of motion 50 relative to switch B so as to receive maximum flux from magnet 20 at a different point from switch B. The conditions prevailing in the embodiment of FIG. 2 again exist and the switches A and B are simultaneously actuated only when the displacement is to the right in the drawing and in the operating range 49 (FIG. 2a).

It should be noted that in both of the embodiments of FIGS. 2 and 3 either the switches or the magnet 20 may be driven with respect to each other. It matters not whether the magnet be driven by the prime mover or the switches be driven by the prime mover, so long as the switches be properly located with respect to each other and with respect to the magnet such that one switch is linked by a lesser flux and their region of actuation for displacements in one direction overlap.

There has thus been described a relatively simple yet accurate direction-sensitive displacement transducer utilizing reed switches which require relatively little actuating force and hence place little loading upon the prime mover.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A direction sensitive displacement transducer for sensing the displacement of an object along an axis, comprising:

first and second reed switches each having by a predetermined closing and a lesser predetermined opening magnetic flux, magnet means providing a magnetomotive force, means positioning said switches at different points along said axis relative to each other, said switches being positioned relative t osaid axis such that the flux from said magnet means that is effective to close the reeds of said first switch is less than the flux from said magnet means that is effective to close the reeds of said second switch, means responsive to said object for displacing said magnet means and said switches along said axis relative to each other, thereby to vary the flux linking respective ones of said reed switches between at least that required to close the respective switches and a lesser value, and means for detecting when the reeds of both of said pairs of switches are closed, thereby to sense a predetermined directional displacement of said object.

2. The transducer set forth in claim 1 wherein said switches are fixedly positioned relative to said axis.

3. The transducer set forth in claim 1 wherein said first switch is positioned at a greater radial distance from said axis than said second switch.

4. The transducer set forth in claim 3 wherein each of said switches includes a pair of ferromagnetic reeds mounting switch contacts, and wherein the switches are positioned such that their reeds are other than transverse to the line of motion of said magnet means.

5. The transducer set forth in claim 1 wherein each of said reed switches has a pair of reeds mounting switch contacts and each of said pairs of reeds lies along a different axis, said different axes forming an acute angle with respect to each other.

6. The transducer set forth in claim 5 wherein the axis of one of said pairs of reeds is substantially parallel to said object's displacement axis.

7. A direction sensitive displacement transducer for sensing the displacement of an object, along an axis, comprising:

first and second reed switches each actuated by a predetermined closing and a lesser predetermined opening magnetic flux, magnet means providing a magnetomotive force, means positioning said switches at different points along said axis relative to each other whereby, said first switch has a higher predetermined closing flux than said second switch, means responsive to said object for displacing said magnet means and said switches along said axis relative to each other thereby to vary the flux linking said reed switches, and means for detecting when both of said pairs of switches are actuated thereby to sense a predetermined directional displacement of said object.

References Cited

UNITED STATES PATENTS

| | | | |
|---|---|---|---|
| 2,877,361 | 3/1959 | Chase | 200—87 |
| 2,912,540 | 11/1959 | Sawicki | 335—161 |
| 3,161,742 | 12/1964 | Bango | 335—208 |

BERNARD A. GILHEANY, *Primary Examiner.*

J. J. BAKER, R. N. ENVALL, Jr., *Assistant Examiners.*